(12) United States Patent
Tsujimoto

(10) Patent No.: US 8,934,107 B2
(45) Date of Patent: *Jan. 13, 2015

(54) MULTIFUNCTION APPARATUS

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,469

(22) Filed: Sep. 16, 2011

(65) Prior Publication Data

US 2012/0069376 A1 Mar. 22, 2012

(30) Foreign Application Priority Data

Sep. 22, 2010 (JP) ................................. 2010-212600

(51) Int. Cl.
*G06K 15/02* (2006.01)
*H04N 1/00* (2006.01)

(52) U.S. Cl.
CPC ....... *H04N 1/00464* (2013.01); *H04N 1/00244* (2013.01); *H04N 1/0044* (2013.01); *H04N 2201/001* (2013.01); *H04N 2201/0094* (2013.01)
USPC ......................................... 358/1.13; 358/1.15

(58) Field of Classification Search
USPC .......... 358/1.18, 1.9, 1.13, 1.8, 1.15; 707/781
See application file for complete search history.

(56) References Cited

U.S. PATENT DOCUMENTS

| | | | |
|---|---|---|---|
| 5,422,993 A | 6/1995 | Fleming | |
| 5,950,045 A | 9/1999 | Nomura et al. | |
| 6,421,509 B1 | 7/2002 | Nomura et al. | |
| 7,096,265 B2 * | 8/2006 | Simpson et al. | ............... 709/226 |
| 7,859,694 B2 * | 12/2010 | Inada | ............................ 358/1.15 |
| 8,176,075 B2 * | 5/2012 | Kuroyanagi | ................... 707/781 |
| 8,325,354 B2 | 12/2012 | Yoshida et al. | |
| 2002/0004802 A1 | 1/2002 | Shima | |
| 2002/0147661 A1 | 10/2002 | Hatakama et al. | |
| 2002/0171681 A1 | 11/2002 | Nomura et al. | |
| 2004/0246762 A1 | 12/2004 | Inada | |
| 2005/0046887 A1 | 3/2005 | Shibata et al. | |
| 2006/0143185 A1 | 6/2006 | Kuroyanagi | |

(Continued)

FOREIGN PATENT DOCUMENTS

| | | |
|---|---|---|
| CN | 101056346 A | 10/2007 |
| CN | 101087341 A | 12/2007 |

(Continued)

OTHER PUBLICATIONS

Related U.S. Appl. No. 13/251,372, filed Oct. 3, 2011.

(Continued)

*Primary Examiner* — King Poon
*Assistant Examiner* — Marchelle L Taggart
(74) *Attorney, Agent, or Firm* — Renner, Otto, Boisselle & Sklar, LLP

(57) ABSTRACT

A multifunction apparatus includes: a second storage section for storing display image data for displaying an image on the display section, the second storage section storing the display image data corresponding to the processing target image data; and an apparatus control section for generating location information indicating a location of the display image data. Further, in accordance with operation screen data including the location information, a web browser section obtains the display image data indicated by the location information from the second storage section and performs the display section to display an operation screen including an image indicated by the display image data.

7 Claims, 7 Drawing Sheets

(56) References Cited

U.S. PATENT DOCUMENTS

| | | |
|---|---|---|
| 2007/0159663 A1 | 7/2007 | Tsujimoto |
| 2007/0165265 A1 | 7/2007 | Ito et al. |
| 2007/0182986 A1 | 8/2007 | Ciriza et al. |
| 2007/0268517 A1 | 11/2007 | Koarai |
| 2008/0123127 A1 | 5/2008 | Okamoto et al. |
| 2008/0150952 A1 | 6/2008 | Koarai |
| 2010/0073701 A1 | 3/2010 | Okada et al. |
| 2011/0102827 A1 | 5/2011 | Nishino et al. |

FOREIGN PATENT DOCUMENTS

| | | |
|---|---|---|
| JP | 04-296965 A | 10/1992 |
| JP | 10-326288 A | 12/1998 |
| JP | 11-231729 | 8/1999 |
| JP | 2000-092257 A | 3/2000 |
| JP | 2001-127986 A | 5/2001 |
| JP | 2001-154773 A | 6/2001 |
| JP | 2002-300338 A | 10/2002 |
| JP | 2002-344682 A | 11/2002 |
| JP | 2003-032413 A | 1/2003 |
| JP | 2003-150484 A | 5/2003 |
| JP | 2003-308195 | 10/2003 |
| JP | 2005-045370 A | 2/2005 |
| JP | 2005-080018 A | 3/2005 |
| JP | 2005-102044 A | 4/2005 |
| JP | 2005-346739 A | 12/2005 |
| JP | 2006-203870 A | 8/2006 |
| JP | 2006-237705 A | 9/2006 |
| JP | 2007-174400 A | 7/2007 |
| JP | 2008-003833 A | 1/2008 |
| JP | 2008-131388 A | 6/2008 |
| JP | 2008-139981 A | 6/2008 |
| JP | 2008-199151 A | 8/2008 |
| JP | 2008-287531 A | 11/2008 |
| JP | 2009-208430 A | 9/2009 |
| JP | 2010-74573 A | 4/2010 |
| JP | 2011-096098 A | 5/2011 |
| JP | 2011-097454 A | 5/2011 |

OTHER PUBLICATIONS

Related U.S. Appl. No. 13/448,736, filed Apr. 17, 2012.

Office Action mailed on Jan. 31, 2013 for related U.S. Appl. No. 13/251,372.

Office Action mailed on Feb. 7, 2013 for related U.S. Appl. No. 13/448,736.

Office Action mailed on Jan. 4, 2012 for related U.S. Appl. No. 12/073,442, now U.S. Patent No. 8,325,354 issued on Dec. 4, 2012.

Office Action for related U.S. Appl. No. 13/448,736 mailed on Sep. 19, 2013.

Office Action for related U.S. Appl. No. 13/251,372 mailed on Sep. 27, 2013.

Advisory Action for related U.S. Appl. No. 13/448,736 mailed on Jan. 22, 2014.

Advisory Action for related U.S. Appl. No. 13/251,372 mailed on Jan. 16, 2014.

Examiner's Answer for related U.S. Appl. No. 13/448,736 mailed on Sep. 8, 2014.

* cited by examiner

FIG. 3

| ID | APPLICATION NAME | REGISTERED ADDRESS (URL) |
|---|---|---|
| 1 | DOCUMENT MANAGEMENT | http://example.com/filing |
| 2 | FORM PRINTING | http://example.com/print |

FIG. 4

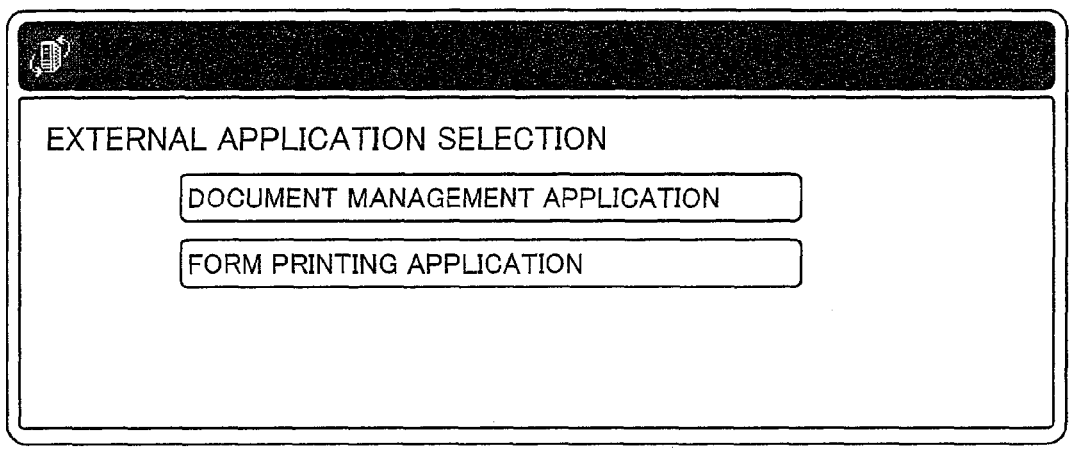

FIG. 5

```
<SOAP-ENV:Envelope
xmlns:SOAP-ENV="http://schemas.xmlsoap.org/soap/envelope/"
SOAP-ENV:encodingStyle="http://schemas.xmlsoap.org/soap/encoding/">
 <SOAP-ENV:Body>
  <GetFileList/>
 </SOAP-ENV:Body>
</SOAP-ENV:Envelope>
```

FIG. 6

```
<SOAP-ENV:Envelope
xmlns:SOAP-ENV="http://schemas.xmlsoap.org/soap/envelope/"
SOAP-ENV:encodingStyle="http://schemas.xmlsoap.org/soap/encoding/">
 <SOAP-ENV:Body>
  <GetFileListResponse>
   <file>
    <id>1</id>
    <name>sample</name>
    <link>http://127.0.0.1/tmp/file1.png</link>
   </file>
   <file>
    <id>2</id>
    <name>sample2</name>
    <link>http://127.0.0.1/tmp/file2.png</link>
   </file>
   ...
  </GetFileListResponse>
 </SOAP-ENV:Body>
</SOAP-ENV:Envelope>
```

FIG. 7

```
<html>
 <body>
  <h2>DOCUMENT MANAGEMENT APPLICATION</h2>
  <form>
   <p>SELECT FILE TO TRANSMIT/PRINT</p>
   <a href="start.html?id=1"><img src=" http://127.0.0.1/tmp/file1.png"></a>
<a href="start.html?id=2"><img src="http://127.0.0.1/tmp/file2.png"></a>
   <br>
  </form>
 </body>
</html>
```

FIG. 10

```
01 : <html>
02 :   <head>
03 :     <script type="text/javascript">
04 :       function DispUI(jsondata) {
05 :           (Java Script FOR WRITING HTML OF PREVIEW DISPLAY IN div OF
06 :         id="dispUI" ON THE BASIS OF GetFileList)
07 :       }
08 :     </script>
09 :     <script   type="text/javascript" src=http://127.0.0.1/filing/GetFileList>
10 :   </head>
11 :   <body>
12 :     <h2>DOCUMENT MANAGEMENT APPLICATION</h2>
13 :     <form>
14 :      <p>SELECT FILE TO TRANSMIT/PRINT</p>
15 :      <div id="dispUI"/>
16 :     </form>
17 :   </body>
18 : </html>
```

MULTIFUNCTION APPARATUS

This Nonprovisional application claims priority under 35 U.S.C. §119(a) on Patent Application No. 2010-212600 filed in Japan on Sep. 22, 2010, the entire contents of which are hereby incorporated by reference.

TECHNICAL FIELD

The present invention relates to a multifunction apparatus that operates in cooperation with an application of an information processing apparatus.

BACKGROUND ART

Multifunction apparatuses each having functions of a copying machine, a scanner, a printer, a facsimile machine, and the like have been conventionally known. There have been some techniques in which image data is stored in such a multifunction apparatus or a server and, if necessary, an editing process, an output process, etc. are performed on the image data. Patent literature 1, for example, discloses a system for previewing and editing, on a web browser of a client apparatus, an image stored in a server device.

Further, in recent years, a multifunction apparatus and an information processing apparatus are connected to each other via a communication network so as to perform various processes. That is, a multifunction apparatus serves as a part of a total application system in such a manner that an application operating on an information processing apparatus and a function of the multifunction apparatus operate in cooperation with each other. This makes it easier to construct a flexible service by combining a function of the multifunction apparatus and a function of a personal computer (PC) appropriately. Patent literature 2, for example, discloses a multifunction apparatus control system including a multifunction apparatus and a control apparatus that transmits a control instruction to the multifunction apparatus via a communication network.

CITATION LIST

Patent Literature 1
Japanese Patent Application Publication, Tokukai, No. 2006-237705 A (Publication Date: Sep. 7, 2006)
Patent Literature 2
Japanese Patent Application Publication, Tokukai, No. 2007-174400 A (Publication Date: Jul. 5, 2007)

SUMMARY OF INVENTION

Technical Problem

Patent literature 1 discloses that, in the case of editing image data by using a client apparatus, processing such as instructing printing is to be performed by the client apparatus after editing the image data. Therefore it is necessary for a user to go to a multifunction apparatus to pick up a printed matter, around a time when the printing is completed. Further, if a distance between the client apparatus and the multifunction apparatus is long, the printed matter supplied from the multifunction apparatus is highly possible to be seen by a third party, which leads to a problem of information leakage.

In view of such problems, the following system is preferable: a system in which image data is accumulated in a multifunction apparatus, an image (a preview image) indicated by the image data is displayed on an operation screen of the multifunction apparatus, and an image data to be printed is selected. This system can reduce to forget to pick up a printed matter and also reduce a risk of information leakage.

However, in the case where the aforementioned system is applied to a system (such a system as described in Patent literature 2) in which an application operating on the information processing apparatus and a function of the multifunction apparatus are operated in cooperative with each other, the following problem arises. This is because, in the system in which an application of the information processing apparatus and a function of the multifunction apparatus are operated in cooperative with each other, an operation screen displayed on the multifunction apparatus is also controlled by the application of the information processing apparatus.

Specifically, in order to display a list of images on an operation screen of a multifunction apparatus, an information processing apparatus obtains image data, which is accumulated in the multifunction apparatus, from the multifunction apparatus. Then, on the basis of the obtained image data, an application of the information processing apparatus generates display image data which is data to be displayed on the operation screen. Finally, the display image data generated by the information processing apparatus is transmitted to the multifunction apparatus, and an image indicated by the display image data is displayed on the operation screen of the multifunction apparatus. In order to generate display image data, the information processing apparatus needs to obtain image data from the multifunction apparatus as described above. It takes a long time for communicating image data and forming display image data in the information processing apparatus. This accordingly takes a long time until an image is displayed on the operation screen.

The present invention has been made in view of the aforementioned problems, and an object of the present invention is to provide a multifunction apparatus that (i) operates in cooperation with an application of an information processing apparatus and (ii) causes its display section to display an operation screen including an image indicated by image data stored in the multifunction apparatus in a short time.

Solution to Problem

In order to achieve the aforementioned problem, the present invention provides a multifunction apparatus which communicates to an information processing apparatus via a communication network, the information processing apparatus including a first web server section operating in accordance with software of a web server, and performs cooperative processing in operation with an external application executed in the information processing apparatus, the multifunction apparatus including: a display section; a web browser section for operating in accordance with software of the web browser and causing the display section to display a screen in accordance with data received from the first web server section; a first storage section for storing processing target image data to be subjected to processing; a second storage section for storing display image data for displaying an image on the display section, the second storage section storing the display image data corresponding to the processing target image data; and a control section for generating location information indicating a location of the display image data stored in the second storage section, in accordance with operation screen data including the location information generated by the control section, the web browser section obtaining the display image data indicated by the location information from the second storage section and performing an operation screen display process of displaying, on the display section, an operation screen including an image indicated by the display image data.

Advantageous Effects of Invention

According to the present invention, a multifunction apparatus operates in cooperation with an application of an information processing apparatus, and causes its display section to display an operation screen including an image indicated by image data stored in the multifunction apparatus in a short time.

BRIEF DESCRIPTION OF DRAWINGS

FIG. 3 shows an example of an application information management table.

FIG. 4 shows an example of an application selection screen.

FIG. 5 shows a sample of a command of GetFileList with use of SOAP.

FIG. 6 shows a sample of a response to GetFileList with use of SOAP.

FIG. 7 shows an example of HTML data of an operation screen including location information.

FIG. 10 shows an example of HTML data that is transmitted to a multifunction apparatus from an information processing apparatus.

DESCRIPTION OF EMBODIMENTS

[Embodiment 1]

An embodiment of the present invention will be described below with reference to FIG. 1 to FIG. 8. Hereinafter, description will be made of an embodiment of a multifunction apparatus control system according to the present invention.

Figure 1:
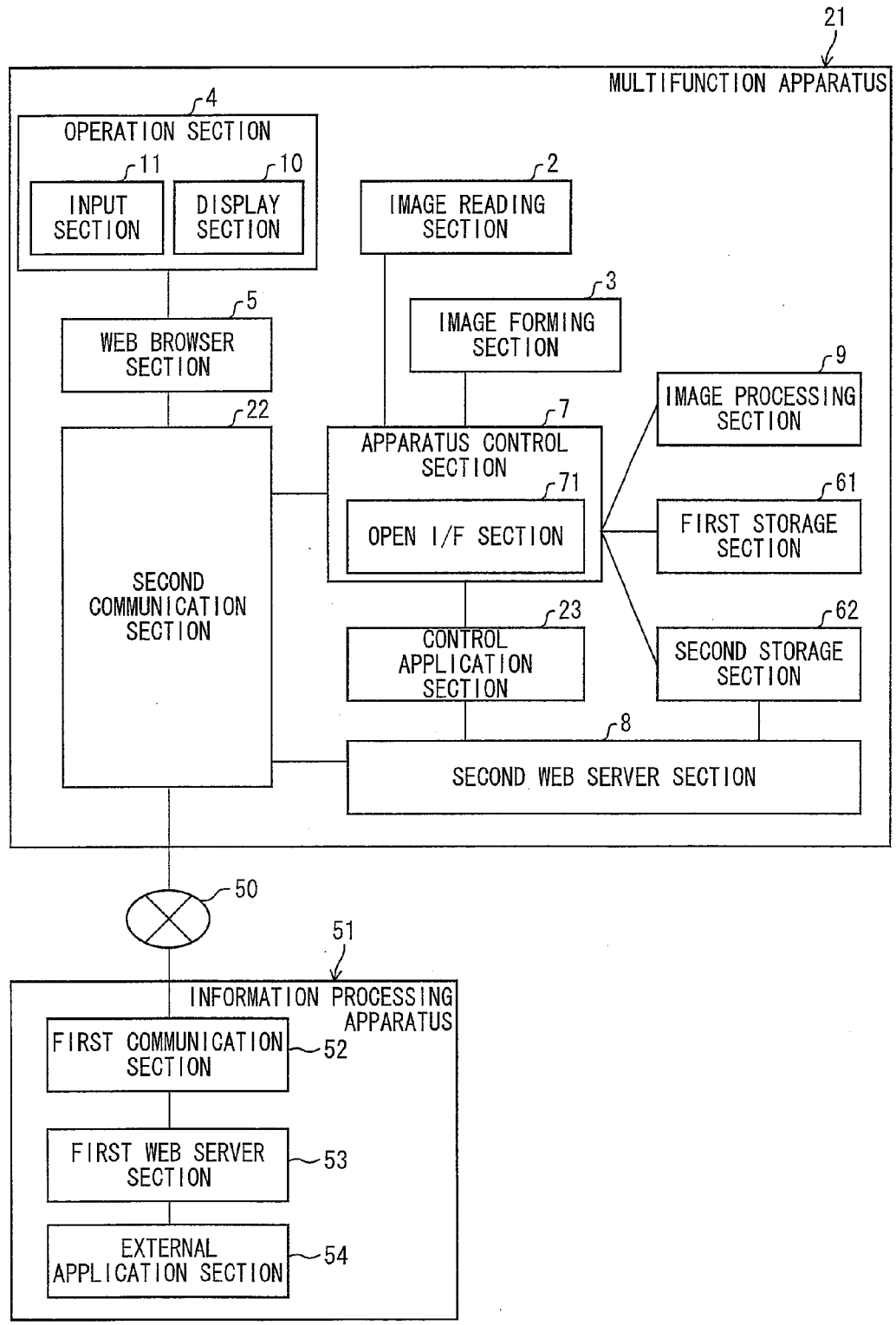
FIG. 1 shows a configuration of a multifunction apparatus control system according to an embodiment of the present invention.

FIG. 1 shows a configuration of a multifunction apparatus control system according to this embodiment. As shown in FIG. 1, the multifunction apparatus control system according to this embodiment includes a multifunction apparatus (multifunction peripheral) 21 and an information processing apparatus 51 that are connected to each other via a communication network 50. As a matter of course, the multifunction apparatus control system may include a plurality of multifunction apparatuses 21 and a plurality of information processing apparatuses 51.

Note that examples of the communication network 50, which connects the multifunction apparatus 21 and the information processing apparatus 51, include the Internet, telephone network, serial cables, and other wired and wireless lines.

The multifunction apparatus 21 receives a control command from the information processing apparatus 51. Then, on the basis of the received control command, the multifunction apparatus 21 executes its various functions (for example, a scanning function, a printing function, and a communication function).

For example, the multifunction apparatus 21 receives, from the information processing apparatus 51, hypertext markup language (HTML) data indicating an operation screen and displays the operation screen indicated by the HTML data. Then the multifunction apparatus 21 transmits contents of instruction, which is inputted via the operation screen, to the information processing apparatus 51, and executes various functions in accordance with a control command received from the information processing apparatus 51.

Alternatively, the multifunction apparatus 21 may perform any of its various functions by executing a command described in Java (registered trademark) script in control commands received from the information processing apparatus 51.

The information processing apparatus 51 is a computer device constituted by an arithmetic processing section such as a CPU or a special purpose processor and a storage section such as a RAM, a ROM, or an HDD, and functions as a web server device that is shared by the plurality of multifunction apparatuses 21. As shown in FIG. 1, the information processing apparatus 51 includes a first communication section 52, a first web server section 53, and an external application section 54.

The first communication section 52 communicates to the multifunction apparatus 21 via LAN, an Internet line, or the like. Further, the first communication section 52 communicates to the multifunction apparatus 21 with use of a communication protocol such as an HTTP.

The first web server section 53 operates in accordance with software in a web server. The term "web server" here means software that provides a function of a server device constituting the WWW (world wide web) that is an information system on the Internet. The first web server section 53 functions to receive a request (which is an HTTP request herein) from the multifunction apparatus 21 via the first communication section 52 and respond to the multifunction apparatus 21 via the first communication section 52 with a file, image data, printing data, a control command, etc. corresponding to the HTTP request.

The external application section 54 is a block which operates in accordance with a predetermined web application in response to an instruction from the first web server section 53. That is, the external application section 54 performs an operation in accordance with a corresponding one of the various web applications (hereinafter, referred to as "external applications") that operate on the web server.

For example, in the case where a request (hypertext transfer protocol (HTTP) request herein) from the multifunction apparatus 21 is a transmission request for an operation screen, the external application section 54 operates in accordance with an operation screen transmission program of the selected external application. Specifically, the external application section 54 generates HTML data of the operation screen designated by the transmission request, and transmits the HTML data to the first web server section 53.

Further, in the case where a request from the multifunction apparatus 21 is a transmission request for printing data, the external application section 54 operates in accordance with a printing application. Specifically, the external application section 54 obtains printing data of the designated file from a folder designated by the transmission request, and transmits the printing data to the first web server section 53.

Next, a configuration of the multifunction apparatus 21 will be described. The multifunction apparatus 21 can execute a plurality of functions, such as a scanning function, a printing function, a facsimile sending/receiving function, and an image data transmitting function.

As shown in FIG. 1, the multifunction apparatus 21 includes an operation section 4, an image reading section 2, an image forming section 3, a web browser section 5, a second communication section 22, an apparatus control section (control section) 7, a second web server section 8, a control application section 23, an image processing section 9, a first storage section 61, and a second storage section 62.

The operation section 4 is a user interface via which (i) a user is notified of various information and (ii) the multifunction printer 21 receives input from a user. The operation section 4 includes a display section 10, such as a liquid crystal display, and an input section 11 including various input keys. Note that the operation section 4 can be a touch panel in which the display section 10 and the input section 11 are integrally provided.

The image reading section 2 includes a scanner and a document carrying section that carries a document to the scanner. The image reading section 2 reads, as image data, objects (such as characters and images) that are printed on a document. Note that the image reading section 2 reads an image so that a read image has a predetermined resolution.

The image forming section 3 is provided for printing an image (character/photograph/graphic) on a recording sheet such as paper in accordance with inputted image data. The image forming section 13 includes a photoreceptor drum, a charging device, an exposure device, a developing device, a transfer device, a fixing device, a sheet tray, and the like.

The second communication section 22 is an interface via which the multifunction apparatus 21 communicates to an external apparatus, such as the information processing apparatus 51. In this embodiment, the second communication section 22 communicates to the information processing apparatus 51 as described above. In addition, in the case where the IP address of the multifunction apparatus 21 is indicated as a destination of access, the second communication section 22 can also access the second web server section 8 inside the multifunction apparatus 21.

The web browser section 5 operates in accordance with software of a general-purpose web browser. The web browser section 5 can communicate not only to the first web server section 53 in the information processing apparatus 51 but also to the second web server section 8 inside the multifunction apparatus 21 via the second communication section 22.

The second web server section 8 operates in accordance with software of a general-purpose web server. The second web server section 8 receives a request (HTTP request) from the web browser section 5 and causes the multifunction apparatus 21 to execute an application corresponding to the request, to thereby transmit a response (an HTTP response) to the web browser section 5.

The control application section 23 executes a process in accordance with a web application operating on the web server. Such web applications are, for example, custom applications described in Java (registered trademark) script and operates in a Java (registered trademark) script execution environment provided on the web server.

In the case where a function of the multifunction apparatus 21 (for example, a scanning function, a printing function, and a communication function) needs to be controlled, the control application section 23 sends an instruction for controlling the function to the apparatus control section 7.

The first storage section 61 stores image data to be subjected to an output process (a printing process or an image transmitting process) or an image editing process in the multifunction apparatus 21 (hereinafter, such image data is referred to as "processing target image data"). For example, the first storage section 61 stores, as the processing target image data, image data read by the image reading section 2 and image data received from an external information processing apparatus. Note that the first storage section 61 is set so as not to be accessed by the second web server section 8.

The image processing section 9 performs image processing on processing target image data. For example, for generating image data for printing, the image processing section 9 converts the processing target image data into CMYK image data that can be recognized by the image forming section 3. Further, for generating display image data, the image processing section 9 converts the processing target image data into RBG image data suitable for a color space of the display section 10 and performs decimation process that decreases the numbers of pixels in order to display an image on only a part of the display section 10. Further, the image processing section 9 may also execute various image editing processes on the processing target image data in accordance with an instruction inputted to the operation section 11.

Note that the image processing section 9 performs various processes such as: (1) an analog/digital (A/D) conversion process; (2) a shading correction process of removing various distortions occurring in a lighting system, an image focusing system, and an image sensing system of an image reading section; (3) a tone conversion process such as a γ-correction process; (4) a document type auto-detection process of detecting a type of document automatically; (5) an area segmentation process of determining which image area each pixel of inputted image belongs to and generating an area segmentation signal indicating a result of this determination; (6) a compressing process by encoding a code; (7) a decoding process of decompressing an encoded code; (8) an image quality adjusting process of adjusting a balance of RGB (i.e., color adjustment or whole color adjustment such as adjustment of reddish tint or bluish tint), brightness, and vividness; (9) a color correction process of performing conversion of a color space etc.; (10) a black generation/under color removal process that subtracts black (K) image data from image data of an original CMY image and generates new CMY image data while performing a black generation for generating black (K) image data from CMY image data; (11) a spatial filter process (an emphasizing process, a planarizing process, etc.); (12) an enlargement and reduction process (a scaling process); (13) an output γ-correction process of outputting an image to a recording medium (such as paper) or displaying an image on a display section; (14) a tone reproducing process (an intermediate tone generating process) needed for printing an image. Those processes can be performed with use of well-known arts, and therefore detailed description is herein omitted.

The second storage section 62 is a storage section that stores display image data generated by the image processing section 9, and can be accessed by the second web server section 8.

The apparatus control section 7 controls various functions of the multifunction apparatus 21. Specifically, the apparatus control section 7 controls operations of the image reading section 2, the image forming section 3, the image processing section 9, the second communication section 22, the operation section 4, and other sections.

For example, the apparatus control section 7 controls an operation of the image reading section 2 so as to obtain scanning image data and causes the first storage section 61 to store therein the scanning image data as processing target image data. Further, the apparatus control section 7 controls the image processing section 9 so that the image processing section 9 converts the processing target image data, which is stored in the first storage section 61, into image data for printing, and controls the image forming section 3 so that the image forming section 3 performs a printing process on the basis of the printing image data.

Furthermore, when cooperative processing is performed between an external application and the multifunction apparatus 21 and the second storage section 62 does not store display image data corresponding to the processing target image data stored in the first storage section 61, the apparatus control section 7 controls the image processing section 9 so that the image processing section 9 converts the processing target image data into the display image data. Then, the apparatus control section 7 stores the generated display image data in the second storage section 62.

The apparatus control section 7 has an inherent operation mode and a cooperative operation mode. The inherent operation mode causes the display section 10 (*i*) to display an operation screen inherent to the multifunction apparatus 21 and stored in advance in the multifunction apparatus 21, and receives, from the input section 11, an instruction inputted via the operation screen, to thereby perform such control as described above in accordance with the instruction. Specifically, the cooperative operation mode causes the display section 10 to display an operation screen received from the information processing apparatus 51, then receives a control command generated by the external application on the basis of an instruction inputted via the operation screen, and controls a corresponding one of the various functions in accordance with the control command. That is, the cooperative operation mode performs cooperative processing in which an external application and the multifunction apparatus 21 operate in cooperation with each other. Note that the inherent operation mode is a general mode that is performed in a conventional multifunction apparatus, and therefore detailed description is herein omitted.

Note that, in the case where an instruction to execute the cooperative operation mode has been inputted, the apparatus control section 7 starts up the web browser section 5 and causes the web browser section 5 to perform a process in accordance with a preset URL (which in this embodiment is a URL that requests the first web server section 53 of the information processing apparatus 51 to transmit an initial operation screen). When the multifunction apparatus 21 accesses the external application section 54, the cooperative operation mode is started, and, when the multifunction apparatus 21 stops to access the external application section by receiving notification of the end of the process from the external application section 54, the cooperative operation mode is finished.

Note that the apparatus control section 7 includes an open I/F section 71 capable of receiving a control command regardless of the model of multifunction apparatus 21. The open I/F section 71 discloses to the control application section 23 control commands to control the various functions of the multifunction apparatus 21, and in addition, receives a control command from the control application section 23 and converts the received control command into a command that can be recognized by the apparatus control section 7.

The open I/F section 71 includes a conversion table storage section (not shown) for storing a conversion table in which a disclosed control command and a control command that can be recognized by the apparatus control section 7 are associated with each other, and performs a command conversion process in accordance with the conversion table.

In this way, the open I/F section 71 is capable of receiving a common control command regardless of the model of multifunction apparatus 21. This makes it possible to use a common web application for operating the control application section 23, regardless of the multifunction apparatus 21.

Therefore, in the case of operating the control application section 23 in accordance with a new web application, it is only necessary to install the same web application in the multifunction apparatus 21, and it is no longer necessary to change web applications depending on the model of multifunction apparatus 21. This makes it possible to easily develop a web application for operating the control application section 23.

(Display Process of Preview Image)

Next, a process that causes an image indicated by a display image data to display on the operation screen in the cooperative operation mode will be described in detail, which process is a feature of this embodiment. Herein, an image that is indicated by a display image data and is displayed on the operation screen is referred to as "preview image".

Figure 2:
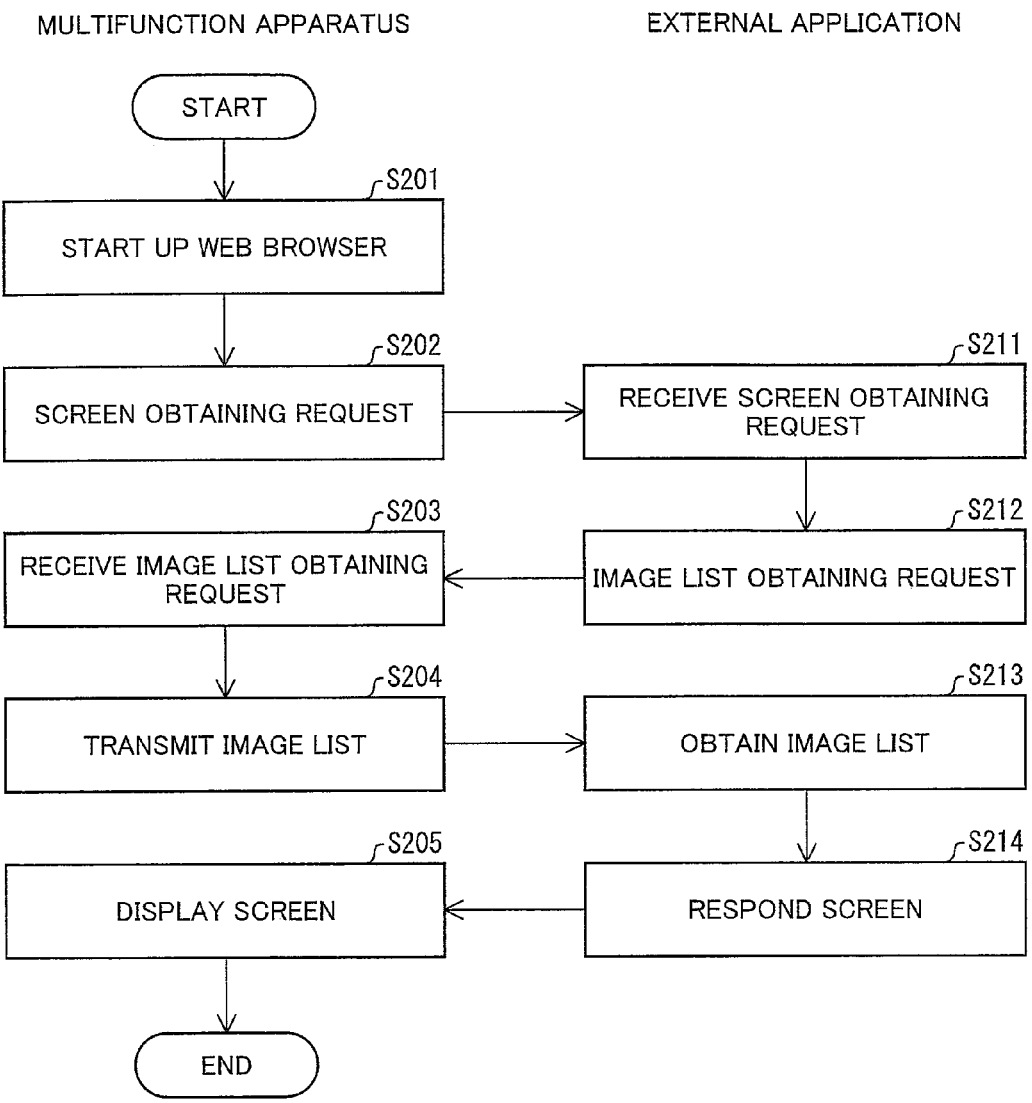
FIG. 2 is a flow chart showing a display process of a preview image in Embodiment 1.

FIG. 2 is a flow chart showing a display process of a preview image. First, when an instruction to start up the cooperative operation mode is inputted via the input section 11, the apparatus control section 7 reads out an application information management table stored in advance. The application information management table is a table in which, in each of the plurality of external applications included in the information processing apparatus 51, application identification information (for example, application name) for identifying the external application and a corresponding uniform resource locator (URL) for accessing the external application are associated with each other. FIG. 3 shows an example of an application information management table.

The apparatus control section 7 causes the display section 10 to display an application selection screen for urging an user to select an external application and including a list of the application identification information in the read-out application information management table. FIG. 4 shows an example of an application selection screen.

When one external application is selected on the application selection screen, the apparatus control section 7 obtains a URL corresponding to the application identification information selected from the application information management table. Then the apparatus control section 7 starts up the web browser section 5 so that the web browser section 5 accesses the obtained URL (S201). With this, the web browser section 5 transmits an HTTP Get command to the one external application indicated by the URL in the information processing apparatus 51 via the second communication section 22, the HTTP Get command requesting transmission of an initial operation screen (S202).

Assume that a document management application is selected herein. The document management application performs processing (such as printing) on processing target image data stored in the multifunction apparatus 21.

When the first web server section 53 of the information processing apparatus 51 receives a Get command (S211), the first web server section 53 requests HTML data of an operation screen corresponding to the Get command to the external application section 54.

The external application section 54 generates HTML data in response to such request. Herein, it is necessary to generate HTML data indicating the operation screen corresponding to the document management application. Since the document management application is an application for performing a process (such as printing) on the processing target image data stored in the multifunction apparatus 21, the external application section 54, and generates HTML data corresponding to an operation screen for urging an user to select a target image and including an image indicated by the processing target image data stored in the multifunction apparatus 21.

First, in order to generate such HTML data as described above, the external application section 54 transmits to the multifunction apparatus 21 a request for a list of processing target image data stored in the first storage section 61 of the multifunction apparatus 21 (this request is referred to as "image list obtaining request") (S212).

The image list obtaining request is performed with use of, for example, an HTTP Get, a POST, or a simple object access protocol (SOAP). An example with use of SOAP is described herein. FIG. 5 shows a sample of a command of an image list obtaining request referred to as a GetFileList with use of the SOAP.

The second communication section 22 of the multifunction apparatus 21 receives the image list obtaining request and forwards the request to the control application section 23 via the second web server section 8 (S203). Then the control application section 23 started up by the second web server section 8 analyzes a command of the request, and sends a control command for the image list obtaining request generated on the basis of a result of the analysis to the apparatus control section 7.

When the apparatus control section 7 receives the command of the image list obtaining request from the control application section 23, the apparatus control section 7 performs the following processing.

First, the apparatus control section 7 generates identification information for identifying each piece of the processing target image data stored in the first storage section 61. Further, the apparatus control section 7 confirms whether display image data corresponding to each piece of the processing target image data is stored in the second storage section 62, and if the display image data is not stored therein, the apparatus control section 7 transmits an instruction to generate the display image data to the image processing section 9. Thereafter, the display image data, which is generated by the image processing section 9, is stored in the second storage section 62. In this way, the apparatus control section 7 stores the display image data corresponding to each piece of the processing target image data in the second storage section 62.

After that, the apparatus control section 7 generates image list information in which, in each piece of the processing target image data stored in the first storage section 61, identification information and a URL (location information) that indicates a location of the display image data corresponding to the processing target image data identified by the identification information are associated with each other, and responds to the control application section 23. Herein, as an IP address included in the URL indicating the location of the display image data, a loopback address (for example, 127.0.0.1) is used.

Then the control application section 23 transmits image list information to the information processing apparatus 51 via the second web server 8 and the second communication section 22 (S204). FIG. 6 shows a sample of a response to a GetFileList with use of a SOAP. FIG. 6 includes list information in which identification information "sample" and its location information "http://127.0.0.1/tmp/file1.png" are associated with each other and identification information "sample 2" and its location information "http://127.0.0.1/tmp/file2.png" are associated with each other.

Next, the external application 54 receives image list information from the multifunction apparatus 21 via the first communication section 52 and the first web server section 53 (S213). Then, on the basis of the received image list information, the external application 54 generates HTML data of an operation screen. For example, the external application 54 generates HTML data of the operation screen including, as a URL of an image, a URL that is location information in the obtained image list information. FIG. 7 shows an example of HTML data. In FIG. 7, the term "img src" indicates a URL of an image. The external application section 54 transmits the generated HTML data to the multifunction apparatus 21 (S214).

Figure 8:
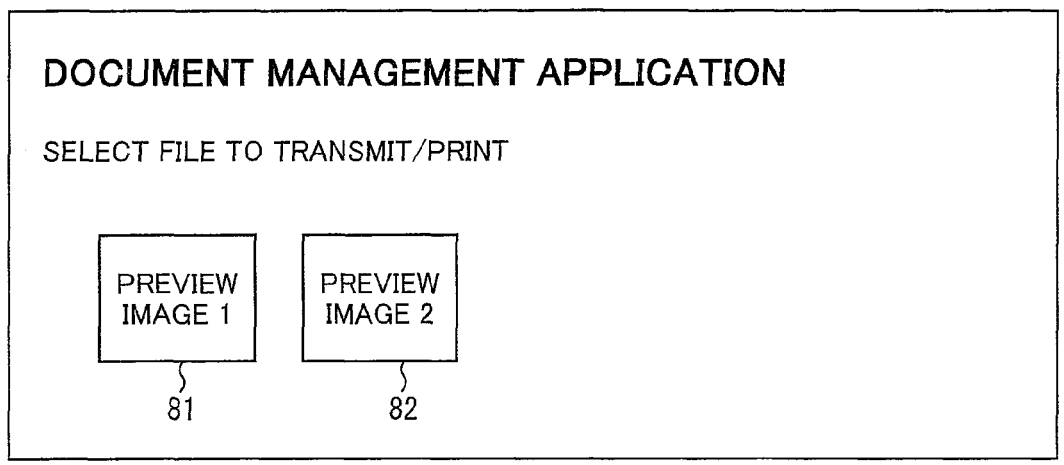
FIG. 8 shows a screen indicated by the HTML data of FIG. 7.

In the multifunction apparatus 21, the web browser section 5 receives the HTML data and performs a process in accordance with the HTML data. That is, the web browser section 5 obtains images to be included in the operation screen in accordance with "img src="http://127.0.0.1/tmp/file1.png"" and "img src="http://127.0.0.1/tmp/file2.png"". The URL of the image herein is indicated by a loopback address such as "http://127.0.0.1 . . . ", and therefore the web browser section 5 accesses the second web server section 8, which is a web server in the multifunction apparatus itself, and receives the image data indicated by the URL from the second web server section 8. In this way, as shown in FIG. 8, the web browser section 5 causes the display section 10 to display the operation screen including images 81 and 82 indicated by the display image data stored in the second storage section 62 (S205).

After that, when an image is selected on the operation screen, the web browser section 5 transmits, to the external application section 54, selection information indicating the selected image. Then the external application section 54 specifies identification information of the selected image indicated by the selection information. The external application section 54 generates a control command indicating execution of a processes (for example, a printing process) to be performed to the processing target image data identified by the identification information, and transmits the command to the multifunction apparatus 21. The transmission of this control command may be carried out by calling the control application section 23 with use of Java (registered trademark) script, by using SOAP, or by other methods. With this, the control application section 23 notifies the apparatus control section 7 of the control command. In accordance with the received control command, the apparatus control section 7 reads out a designated processing target image data from the first storage section 61, and controls each section so that the each section starts executing a designated process (such as a printing process).

Further, after the cooperative processing between the external application section 54 and the multifunction apparatus 21 is finished and the operation screen of the multifunction apparatus 21 is changed to the initial screen as shown in FIG. 4, the apparatus control section 7 deletes the display image data stored in the second storage section 62. This deletion prevents unnecessary data from remaining in the second storage section 62, so that the unnecessary data does not occupy a storage area of the multifunction apparatus 21, thereby reducing an available storage area unnecessarily. Note that, because the multifunction apparatus 21 receives notification of the end of the process from the external application 54, the apparatus control section 7 can determine that the cooperative processing has finished.

According to this embodiment, display image data is formed in the multifunction apparatus 21 and is stored in the second storage section 62 in advance as described above. After that, the apparatus control section 7 generates location information indicating a location of the display image data and transmits the information to the external application section 54. Because the external application section 54 includes only the location information in the HTML data, the web browser section 5 obtains the display image data from the second storage section 62 in accordance with the HTML data, and causes the display section 10 to display an operation screen including an image indicated by the display image data. That is, it is unnecessary to transmit/receive image data itself between the multifunction apparatus 21 and the external application, which in turn results in reducing a time for generating HTML data.

Further, the second storage section 62 accessible from the second web server section 8 stores the display image data, and hence, a URL can be used as the location information. As a result, the web browser section 5 can obtain the display image data from the second web server section 8 on the basis of the URL.

Furthermore, as an IP address, a loopback address is used for a URL indicating the location information of the display image data. Therefore, even if another apparatus has inappropriately obtained HTML data transmitted in S214, the another apparatus cannot obtain display image data of the multifunction apparatus 21 on the basis of location information in the HTML data. That is, only the web browser section 5 of the multifunction apparatus itself can normally obtain the display image data in accordance with the HTML data and display a corresponding image, and an inappropriate access to display image data from another apparatus can be prevented.

<Embodiment 2>

Embodiment 1 discusses a case that (i) the external application section 54 forms the operation screen data including the location information of the display image data and (ii) the operation screen data is transmitted to the multifunction apparatus 21 from the first web server section 53 of the information processing apparatus 51. However, the external application section 54 may send, to the web browser section 5, data including an instruction to execute a process of incorporating location information of display image data into operation screen data, and operation screen data including location information of display image data may be formed in the multifunction apparatus 21. Hereinafter, the description will be made of an embodiment in which operation screen data including location information of display image data is formed in the multifunction apparatus 21.

Figure 9:
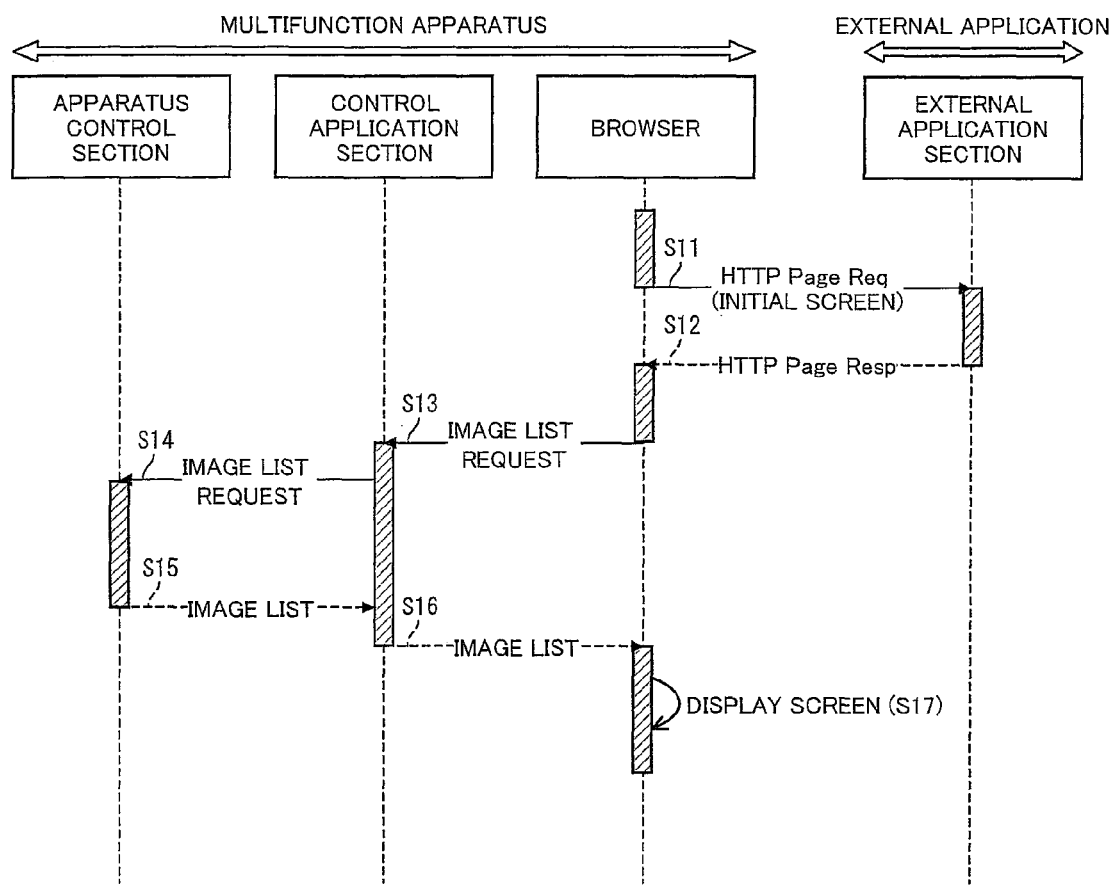
FIG. 9 shows a display process of a preview image in Embodiment 2.

FIG. 9 shows a process of displaying an operation screen including an image indicated by display image data in this embodiment. Note that respective sections constituting a multifunction apparatus 21 and an information processing apparatus 51 of this embodiment are identical with those of Embodiment 1.

First, when an instruction to start up a cooperative operation mode is inputted via an input section 11 and an external application to be executed is selected, an apparatus control section 7 specifies a URL corresponding to the selected external application (assume that a document management application is selected here). Then the apparatus control section 7 starts up the web browser section 5 so that the web browser section 5 accesses the specified URL. This makes the web browser section 5 to transmit an HTTP Get command to the external application of the information processing apparatus 51 indicated by the URL via a second communication section 22, the HTTP Get command requesting transmission of an initial operation screen of the document management application. (S11)

An external application section 54 and a first web server section 53, which have received the HTTP Get command in S11, respond to the multifunction apparatus 21 with HTML data corresponding to the command, i.e., HTML data corresponding to the initial operation screen of the document management (S12). FIG. 10 shows an example of HTML data responded in S12. Note that numbers "01" to "18" on the left of FIG. 10 are described for the sake of easy explanation and are not included in the HTML data.

The web browser section 5, which has received the HTML data as shown in FIG. 10, analyzes the HTML data. A link for calling a control application section 23 via a second web server section 8 with use of a loopback address exists in the ninth line of FIG. 10. Therefore, the web browser section 5 performs the process in the ninth line prior to display of an operation screen.

A <script> tag is described in the ninth line. The <script> tag is generally used for obtaining a Java (registered trademark) script file. But, because a list obtaining request is performed with use of an HTTP Get request, the <script> tag is also used as a method for calling a service of the control application section 23. That is, a loopback address is described in the <script> tag. Therefore, the web browser section 5 accesses the second web server section 8 in the multifunction apparatus itself. Then the web browser section 5 causes the control application section 23 operating on the second web server section 8 to execute a process of requesting a GetFileList (image list) indicated by a URL in the <script> tag (S13). Such approach is a well-known technique called Java (registered trademark) script object notation with padding (JSONP).

The control application section 23 calls the apparatus control section 7 and sends a command of an image list obtaining request (S14). The apparatus control section 7, which has received the command of the image list obtaining request, performs similar processing to Embodiment 1.

Specifically, in order to store display image data corresponding to processing target image data in a second storage section 62, the apparatus control section 7 controls operation of an image processing section 9 and storage to the second storage section 62. Further, the apparatus control section 7 generates image list information in which, in each piece of the processing target image data stored in a first storage section 61, identification information and a URL (location information) that indicates a location of the display image data corresponding to the processing target image data identified by the identification information are associated with each other, and responds to the control application section 23 (S15). Herein, as an IP address included in the URL indicating the location of the display image data, a loopback address (for example, 127.0.0.1) is used.

The control application section 23 responds to the web browser section 5 via the second web server section 8 with the obtained image list information as Java (registered trademark) script for calling a function called DispUI described in the fourth line of FIG. 10 (S16). Note that the image list information is stored in jsondata that is a parameter of the DispUI Java (registered trademark) script function. Such method is also a well-known technique as JSONP.

Then the web browser section 5 executes the function called DispUI of FIG. 10, and therefore the location information indicated by the image list information is supplied to the fifteenth line in the web browser section 5. In this way, the web browser section 5 can generate operation screen data same as that shown in FIG. 7. As a result, as shown in FIG. 8, the web browser section causes a display section 10 to display an operation screen (S17).

Thereafter, after the cooperative processing between the external application section 54 and the multifunction apparatus 21 is finished and the operation screen of the multifunction apparatus 21 is changed to the initial screen as shown in FIG. 4, the apparatus control section 7 deletes the display image data stored in the second storage section 62.

Even in this embodiment, display image data is formed in the multifunction apparatus 21 and is stored in the second storage section 62 in advance as described above. After that, the first web server section 53 sends, to the web browser section 5 of the multifunction apparatus 21, such instruction that the control application section 23 performs the process of incorporating into the operation screen data the location information indicating the location of the display image data. In accordance with the instruction, the web browser section 5 obtains the location information of the display image data, which is generated by the apparatus control section 7, and generates the operation screen data including the obtained location information. Therefore, in accordance with the operation screen data, the web browser section 5 obtains the display image data from the second storage section 62 and causes the display section 10 to display the operation screen including the image indicated by the display image data. That is, it is unnecessary to transmit/receive image data itself between the multifunction apparatus 21 and the external application 54, which in turn results in reducing a time for generating HTML data.

As described above, the present invention provides a multifunction apparatus which communicates to an information processing apparatus via a communication network, the information processing apparatus including a first web server section operating in accordance with software of a web server, and performs cooperative processing in operation with an external application executed in the information processing apparatus, the multifunction apparatus including: a display section; a web browser section for operating in accordance with software of the web browser and causing the display section to display a screen in accordance with data received from the first web server section; a first storage section for storing processing target image data to be subjected to processing; a second storage section for storing display image data for displaying an image on the display section, the second storage section storing the display image data corresponding to the processing target image data; and a control section for generating location information indicating a location of the display image data stored in the second storage section, in accordance with operation screen data including the location information generated by the control section, the web browser section obtaining the display image data indicated by the location information from the second storage section and performing an operation screen display process of displaying, on the display section, an operation screen including an image indicated by the display image data.

According to the aforementioned configuration, in accordance with operation screen data including the location information, the web browser section obtains the display image data indicated by the location information from the second storage section and performs an operation screen display process of displaying, on the display section, an operation screen including an image indicated by the display image data. Therefore the web browser section does not need to obtain display image data from an external information processing apparatus, and may obtain display image data from the second storage section in the multifunction apparatus itself. Further, it is unnecessary to incorporate display image data into operation screen data. This can reduce a communication amount between the first web server section and the web browser section, which in turn results in reducing a time for displaying an operation screen.

Furthermore, it is preferable that the multifunction apparatus according to the present invention further includes a second web server section operating in accordance with the software of the web server and accessible to the second storage section, wherein the location information is a uniform resource locator (URL) for obtaining the display image data via the second web server section.

According to the aforementioned configuration, the location information can be easily formed with use of a general-purpose URL. Further, the web browser section can obtain display image data easily from the second storage section via the second web server section with use of a URL.

Furthermore, in the multifunction apparatus according to the present invention, it is preferable that the URL includes a loopback address as an IP address of the multifunction apparatus.

According to the aforementioned configuration, the web browser section accesses the second web server section of the multifunction apparatus in accordance with the loopback address, to thereby obtain the display image data. Accordingly, even if the URL is inputted to another apparatus, which is different from the multifunction apparatus and includes a web browser, the web browser cannot access the second storage section of the multifunction apparatus itself. This prevents the display image data stored in the second storage section from being seen via an unintended apparatus, which leads to improvement of security.

Furthermore, in the multifunction apparatus according to the present invention, the control section may receive an obtaining request for a list of the display image data from the external application, and, when the control section receives the obtaining request, the control section may generate the location information and transmits the location information to the information processing apparatus, and the web browser section may receive the operation screen data including the location information from the information processing apparatus and may perform the operation screen display process in accordance with the operation screen data thus received, the operation screen data being generated by the information processing apparatus on the basis of the location information that the information processing apparatus has received from the control section.

According to the aforementioned configuration, the control section sends the location information to the information processing apparatus, and the web browser section receives the operation screen data including the location information from the information processing apparatus. Herein, the location information is extremely small in comparison with the display image data in terms of data capacity. Therefore, a communication amount needed for obtaining the operation screen data from the information processing apparatus can be reduced, which leads to reduction of time.

Furthermore, in the multifunction apparatus according to the present invention, the web browser section may perform the operation screen display process in accordance with the operation screen data generated by: receiving, from the first web server section, an execution instruction such that the location information of the display image data is incorporated into the operation screen data; obtaining the location information of the display image data from the control section in accordance with the execution instruction; and generating the operation screen data including the location information thus obtained.

According to the aforementioned configuration, the web browser section generates the operation screen data including the location information in accordance with the execution instruction from the first web server section. With this, the location information do not need to be communicated between the multifunction apparatus and the information processing apparatus in advance, which in turn results in reducing a time for displaying the operation screen can be reduced.

Furthermore, it is preferable that the multifunction apparatus according to the present invention further includes an image processing section generating the display image data by performing an image processing on the processing target image data, wherein, in the case where the display image data corresponding to the processing target image data stored in the first storage section is not stored in the second storage section, the control section controls the image processing section so that the image processing section generates display image data and then stores the display image data in the second storage section.

According to the aforementioned configuration, because the display image data can be generated in the inside of the multifunction apparatus, it is possible to reduce much time than the case where the display data is generated in an external apparatus.

Furthermore, in the multifunction apparatus according to the present invention, it is preferable that the control section deletes the display image data from the second storage section after the cooperative processing is finished.

According to the aforementioned configuration, unnecessary data does not remain in the second storage section, so that unnecessary data does not occupy a storage area of the multifunction apparatus.

The present invention is not limited to the description of the embodiments above, and may be modified in numerous ways by a skilled person as long as such modification falls within the scope of the claims. An embodiment based on a proper combination of technical means disclosed in different embodiments is encompassed in the technical scope of the present invention.

Finally, respective blocks in the multifunction apparatus 21 and the information processing apparatus 51 may be configured by hardware logic, or alternatively, by software with use of a CPU as follows.

Specifically, the multifunction apparatus 21 and the information processing apparatus 51 each include: a central processing unit (CPU) that executes a command of a control program realizing each function; a read only memory (ROM) for storing the program; a random access memory (RAM) on which the program is executed; and a storage device (a recording medium) that stores the program and various data, such as a memory. An object of the present invention can be achieved in the following manner: (i) program code (e.g. an executable code program, an intermediate code program, or a source program) of the control program serving as software for realizing the aforementioned functions is recorded on a recording medium in a computer-readable manner; (ii) this recording medium is supplied to the multifunction apparatus 21 and the information processing apparatus 51; and (iii) the computer (or CPU or MPU) reads out the program code from the recording medium and executes the program.

Examples of such a recording medium include: a tape such as a magnetic tape and a cassette tape; a magnetic disk such as a floppy (registered trademark) disk and a hard disk; a disc including an optical disc, such as a CD-ROM, an MO, an MD, a DVD, and a CD-R; a card such as an IC card (including a memory card) and an optical card; and a semiconductor memory such as a mask ROM, an EPROM, an EEPROM, or a flash ROM.

Alternatively, the multifunction apparatus 21 and the information processing apparatus 51 may be configured so as to be connectable to a communication network, and the program code may be supplied via the communications network. Examples of the communications network are not particularly limited and include the Internet, intranet, extranet, LAN, ISDN, VAN CATV network, virtual private network, telephone network, mobile communications network, and satellite communications network. Further, examples of the transmission media constituting the communications network are not particularly limited and include: wired media such as IEEE 1394, USB, power line communication, cable TV lines, telephone lines, and ADSL lines; infrared light such as IrDA and a remote controller; wireless media such as Bluetooth (registered trademark), IEEE802.11, HDR, mobile telephone network, satellite connection, and terrestrial digital broadcasting network. Note that the present invention may be realized by a computer data signal in a carrier wave, which are realized by electronic transmission of the program code.

Industrial Applicability

The present invention is applicable to a multifunction apparatus for realizing a plurality of functions of a copying machine, a scanner, a printer, a facsimile machine, and the like.

REFERENCE SIGNS LIST

2 image reading section
3 image forming section
4 operation section
5 web browser section
7 apparatus control section (control section)
8 second web server section
9 image processing section
10 display section
11 input section
21 multifunction apparatus
22 second communication section
23 control application section
50 communication network
51 information processing apparatus
52 first communication section
53 first web server section
54 external application section

The invention claimed is:

1. A multifunction apparatus which is programmed to (i) communicate to an information processing apparatus via a communication network, the information processing apparatus including a first web server section operating in accordance with software of a web server, and (ii) perform cooperative processing in operation with an external application executed in the information processing apparatus, the multifunction apparatus comprising:
   a display section;
   a web browser section programmed to operate in accordance with software of the web browser and to cause the display section to display a screen in accordance with data received from the first web server section;
   a first storage section arranged to store processing target image data to be subjected to processing;
   a second storage section arranged to store display image data for displaying an image on the display section, the second storage section storing the display image data corresponding to the processing target image data;
   a control section programmed to generate location information indicating a location of the display image data stored in the second storage section; and
   a second web server section for operating in accordance with the software of the web server and being accessible to the second storage section, wherein the location information is a uniform resource locator (URL) for obtaining the display image data via the second web server section, the web browser section being programmed so that in accordance with operation screen data including the location information generated by the control section, the web browser section obtains the display image data indicated by the location information from the second storage section by accessing the second web server section and performs an operation screen display process of displaying, on the display section, an operation screen including an image indicated by the display image data, the control section being programmed so that the control section receives an obtaining request for a list of the display image data from the external application, and, when the control section receives the obtaining request, the control section generates the location information and transmits the location information to the information processing apparatus, and the web browser section being also programmed so that the web browser section receives from the information processing apparatus the operation screen data including the location information, and performs the operation screen display process in accordance with the operation screen data thus received, the operation screen data being generated by the information processing apparatus on the basis of the location information that the information processing apparatus has received from the control section.

2. The multifunction apparatus according to claim 1, wherein: the URL includes a loopback address as an IP address of the multifunction apparatus.

3. A multifunction apparatus which is programmed to (i) communicate to an information processing apparatus via a communication network, the information processing apparatus including a first web server section operating in accordance with software of a web server, and (ii) perform cooperative processing in operation with an external application executed in the information processing apparatus, the multifunction apparatus comprising:

a display section;

a web browser section programmed to operate in accordance with software of the web browser and to cause the display section to display a screen in accordance with data received from the first web server section;

a first storage section arranged to store processing target image data to be subjected to processing;

a second storage section arranged to store display image data for displaying an image on the display section, the second storage section storing the display image data corresponding to the processing target image data;

a control section programmed to generate location information indicating a location of the display image data stored in the second storage section; and a second web server section for operating in accordance with the software of the web server and being accessible to the second storage section, wherein the location information is a uniform resource locator (URL) for obtaining the display image data via the second web server section, the web browser section being programmed so that the web browser section (i) obtains, in accordance with operation screen data including the location information generated by the control section, the display image data indicated by the location information from the second storage section by accessing the second web server section, (ii) performs an operation screen display process of displaying, on the display section, an operation screen including an image indicated by the display image data, (iii) receives, from the first web server section, an execution instruction such that the location information of the display image data is incorporated into the operation screen data, (iv) obtains the location information of the display image data from the control section in accordance with the execution instruction, (v) generates the operation screen data including the location information thus obtained, and (vi) performs the operation screen display process in accordance with the operation screen data thus generated.

4. The multifunction apparatus according to claim 1, further comprising an image processing section for generating the display image data by performing an image processing on the processing target image data, wherein, in the case where the display image data corresponding to the processing target image data stored in the first storage section is not stored in the second storage section, the control section controls the image processing section so that the image processing section generates display image data and then stores the display image data in the second storage section.

5. The multifunction apparatus according to claim 1, wherein the control section deletes the display image data from the second storage section after the cooperative processing is finished.

6. The multifunction apparatus as set forth in claim 1, wherein the image indicated by the display image data is a preview image of (i) image data read by an image reading section or (ii) image data supplied from the information processing apparatus that is an external apparatus.

7. The multifunction apparatus as set forth in claim 3, wherein the image indicated by the display image data is a preview image of (i) image data read by an image reading section or (ii) image data supplied from the information processing apparatus that is an external apparatus.

* * * * *